June 16, 1964 L. HANER 3,137,825

THREE-PHASE ELECTRONIC SIGNAL GENERATOR

Filed March 28, 1960 3 Sheets-Sheet 1

OPERATIONAL AMPLIFIER

OPERATIONAL AMPLIFIER GENERALIZED FORM

SYNTHESIZED RESONANT CIRCUIT

ACTUAL DIRECT COUPLED AMPLIFIER

INVENTOR.
Lambert Haner
BY
[signature]
HIS ATTORNEY

June 16, 1964 L. HANER 3,137,825

THREE-PHASE ELECTRONIC SIGNAL GENERATOR

Filed March 28, 1960 3 Sheets-Sheet 2

INVENTOR.
Lambert Haner

BY

Emmett W. [signature]

HIS ATTORNEY

June 16, 1964 L. HANER 3,137,825

THREE-PHASE ELECTRONIC SIGNAL GENERATOR

Filed March 28, 1960 3 Sheets-Sheet 3

INVENTOR.
Lambert Haner
BY
HIS ATTORNEY

United States Patent Office 3,137,825

Patented June 16, 1964

3,137,825

THREE-PHASE ELECTRONIC SIGNAL GENERATOR

Lambert Haner, Rocky River, Ohio, assignor to Avtron Manufacturing Inc., a corporation of Ohio Filed Mar. 28, 1960, Ser. No. 18,029
9 Claims. (Cl. 331—45)

This invention relates generally to electronic oscillators or wave generators, and more particularly to a three-phase wave or signal generator of variable frequency.

It is frequently desirable to have a multi-phase supply of variable frequency for testing and measuring the performance of electrical equipment. The most common requirement is for a three phase supply with the three phases at 120° intervals, such being needed for the testing and servicing of 400 cycle 3-phase alternator sets of self-contained electrical systems. It must be possible to vary the frequency of the supply accurately between predetermined limits, and the amplitude of the three phases and the 120° intervals between them must be accurately maintained throughout the frequency range. This is necessary to permit accurate measurement and evalution of system and component performance.

Various types of three-phase wave generators have been proposed before now but they have generally used complex circuitry and have been relatively expensive and inefficient. One type which utilizes external phase shift networks to provide the three phase signals has the obvious disadvantage that the phases must be balanced for each adjustment in frequency. Another type utilizes three amplifiers in a ring configuration forming a phase-shift oscillator, the signal in each amplifier being shifted 120° from the preceding. With this type, the phase interval is dependent upon the gain in each amplifier or stage and the amplitude of each phase signal is likewise dependent upon the gain. This makes it difficult to obtain the proper phase balancing and to maintain balance when the frequency is varied. Yet another type using controlled multivibrators firing at spaced intervals has the disadvantage of complexity and does not provide a sinusoidal output.

The principal object of the invention is to provide a new and improved variable frequency oscillator providing a multi-phase output and featuring accurately maintained angular intervals between phases.

Another object of the invention is to provide an oscillator as stated above wherein phase balance is inherent in the circuitry and wherein the amplitude of the phase voltages is closely regulated.

A more specific object is to provide a variable frequency three phase electronic signal generator wherein the frequency is determined entirely by passive networks consisting of resistance and capacitance and is substantially independent of the characteristics of active elements such as the gain of tubes or electron control devices, and wherein the amplitude of the output is closely regulated and readily adjusted by a regulator circuit.

A feature of the invention is the use of standardized plug-in amplifier units for performing the principal active functions in the signal generator, these units being all alike and interchangeable.

In accordance with the invention, an electronic oscillator or signal generator meeting the foregoing objects comprises a three stage closed loop or ring oscillator wherein each stage consists of an amplifier provided with internal feedback to achieve unity gain and either 90° or 180° phase shift between stages. The oscillator loop is closed, its overall gain is unity, and its overall phase shift is 360°; thus it is equivalent to a resonant circuit with a very high Q and will provide a sinusoidal output when a positive or regenerative signal is fed back into it. By designing the stages which have the 90° phase shift such that their gain varies with frequency, the frequency of oscillation can be varied by controlling the gain of these stages. Also by using high gain amplifiers permitting a very high degree of internal feedback within each stage, the gain per stage becomes substantially independent of tube characteristics and is determined exclusively by the feedback network. Since the feedback network consists of passive elements, namely resistance and capacitance, which are very stable, a high degree of frequency stability is achieved.

In a preferred embodiment, the amplitude of oscillation is controlled by a novel regulator circuit which is combined into the oscillator and which allows the amplitude to be set and maintained constant throughout the entire frequency range of the oscillator. The regulator circuit controls the amplitude of the output without causing any changes in frequency.

To obtain the desired three phase output, the 90° or 180° phase signals from the closed loop oscillator, which may be termed the W, X, Y, and Z quadrature phase signals, are combined in trigonometric proportions by addition of predetermined fractions. This is done by means of resistive voltage dividers at the inputs of power amplifiers so that the resultants are independent of frequency. The outputs of the power amplifiers are the desired three phases, that is phases I, II, and III at 120° angular intervals. By using a high degree of internal feedback in each power amplifier, the relative magnitudes and phase intervals of the three output phase signals are accurately maintained. Also, since the angular intervals between the output phase signals are established by the addition of fractions of components which are invariant with frequency, the 120° angular intervals between output phase signals are accurately maintained throughout the frequency range of the system.

For further objects and advantages and for a better understanding of the invention, attention is now directed to the following description of a preferred embodiment in conjunction with the accompanying drawings. The features of the invention believed to be novel will be more fully pointed out in the appended claims.

In the drawings wherein like reference characters refer to corresponding elements or values in the several figures.

Figure 1:
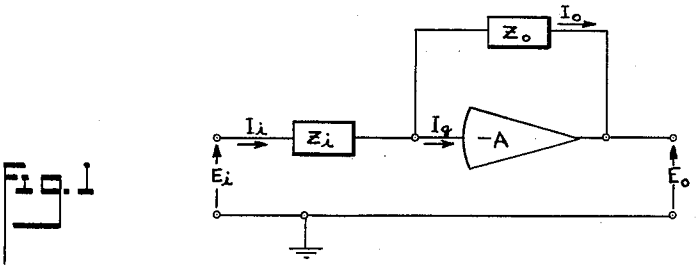
FIG. 1 is a diagram of an operational amplifier to illustrate fundamental relationships.

The principles underlying the invention may be most readily comprehended by considering the transfer characteristics of an operational amplifier having a gain of —A, a series input impedance $Z_i$, and a feedback impedance $Z_o$. These are complex quantities and the gain of —A actually represents a voltage gain of A coupled with phase reversal. Let there be assumed an input voltage $E_i$, an input current $I_i$, a voltage $E_g$ at the control electrode or grid of the amplifier proper, an output voltage $E_o$, and a feedback current $I_o$ through $Z_o$, as indicated in FIG. 1. If now the assumption is made that the current $I_g$ at the grid of the operational amplifier is zero (being vanishingly small in fact), then:

$$I_i=I_o \qquad \text{(I)}$$

Since $$I_i=\frac{E_i-E_g}{Z_i}, I_o=\frac{E_g-E_o}{Z_o},$$

and $$E_g=\frac{E_o}{-A}.$$

then by substitution in Equation I:

$$\frac{E_i+\frac{E_o}{A}}{Z_i}=\frac{-\frac{E_o}{A}-E_o}{Z_o} \qquad \text{(II)}$$

By regrouping, the above reduces to:

$$\frac{E_o}{E_i}=-\frac{\frac{Z_o}{Z_i}}{1+\frac{1}{A}\left[1+\frac{Z_o}{Z_i}\right]} \qquad \text{(III)}$$

If the amplifier gain is assumed to be large (in fact it is close to 1000), the foregoing expression reduces to:

$$\frac{E_o}{E_i}=-\frac{Z_o}{Z_i} \qquad \text{(IV)}$$

Equation IV simply states that for an amplifier having a very large gain (assumed to be infinite), the ratio of output to input signals will be the complex ratio of feedback to input impedances. Hence by making the feedback and input impedances equal resistances, the output signal will be equal to the input signal and merely reversed in phase. However by making the feedback impedance a capacitance having at a given frequency a reactance equal to the resistance of the input impedance, the output signal will be equal in magnitude to the input signal but advanced in phase 90°.

Figure 2:
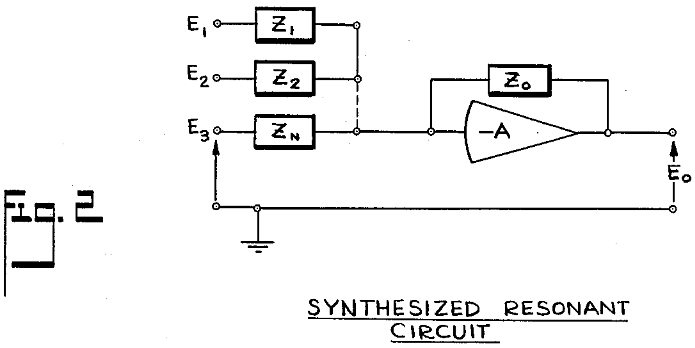
FIG. 2 is a diagram of an operational amplifier provided with three inputs.

FIG. 2 illustrates a generalized form of operational amplifier having multiple inputs $E_1, E_2 \ldots E_n$ through series input impedances $Z_1, Z_2 \ldots Z_n$. The mathematical relationship for this configuration is given by:

$$E_o=-\frac{Z_o}{Z_1}\cdot E_1+\frac{Z_o}{Z_2}\cdot E_2+\cdots+\frac{Z_o}{Z_n} \qquad \text{(V)}$$

The foregoing shows that for multiple inputs, the output signal $E_o$ is the sum of the terms corresponding to each input, where each term is the input signal multiplied by the ratio of the feedback impedance to its input impedance, namely $Z_o/Z_n$.

Figure 3:
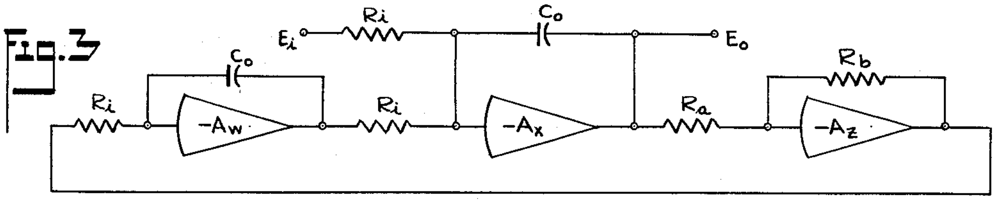
FIG. 3 is a diagram of three operational amplifiers joined in a loop to form a synthetic resonant circuit.

In accordance with invention, a synthetic resonant circuit is provided by connecting three operational amplifiers in a closed loop or ring configuration as illustrated in FIG. 3. All the amplifiers have substantially unity gain, achieved by making the absolute ratio of feedback to input impedances equal to unity in each case. In the case of amplifiers $-A_W$ and $-A_X$, the input impedance is a resistance $R_i$ and the feedback impedance is a capacitance $C_o$; at the resonant frequency $f_r$ which makes the reactance $wC_o$ of capacitance $C_o$ (where $w=2\pi f_r$), equal in magnitude to $R_i$, these amplifiers will have unity gain and produce a 90° phase shift. In the case of amplifier $-A_Z$, the input impedance is a resistance $R_a$ and the feedback impedance is likewise a resistance $R_b$. If $R_a$ and $R_b$ are made equal, amplifier $-A_Z$ will have unity gain and 180° phase shift. From purely qualitative reasoning, it is seen that the amplifier loop is equivalent to an oscillator since the phase shift around the loop is 360° or 0° and the loop gain is unity. The loop will oscillate or tend to oscillate at that frequency which makes the gain of amplifiers $-A_W$ and $-A_X$ unity.

The foregoing may be more rigorously established from consideration of the transfer function relating $E_o$ to $E_i$ in the circuit of FIG. 3, which may be written as follows:

$$\frac{E_o}{E_i}=\frac{\frac{1}{jwC_oR_i}}{1+\frac{1}{jwC_oR_i}\cdot\frac{1}{jwC_oR_i}\cdot\frac{R_b}{R_a}} \qquad \text{(VI)}$$

The foregoing reduces to:

$$\frac{E_o}{E_i}=\frac{\frac{jw}{R_iC_o}}{w^2+\frac{R_b}{R_aR_i^2C_o^2}} \qquad \text{(VII)}$$

The transfer function of Equation VII represents a circuit having an infinite Q (ratio of reactance to resistance), and a resonant frequency given by the following:

$$f_r=\frac{1}{2\pi R_iC_o}\sqrt{\frac{R_b}{R_a}} \qquad \text{(VIII)}$$

A resonant circuit with an infinite Q is an oscillator. However the transfer function of Equation VII is hypothetical in the sense that the amplifier gain has been assumed to be infinite whereas in fact it must of course be finite. In the actual physical circuit to be described, the gain of the amplifiers is approximately 1000. Under these conditions, the measured Q of the actual synthetic resonant circuit is approximately 300. Such being the case, the real transfer function may be shown to be given by:

$$\frac{E_o}{E_i}=\frac{\frac{jw}{R_iC_o}}{-w^2+\frac{jw}{QR_iC_o}\sqrt{\frac{R_b}{R_a}}+\frac{R_b}{R_aR_i^2C_o^2}} \qquad \text{(IX)}$$

For the case where $R_a=R_b$, the resonant frequency is given very simply by:

$$f_r=\frac{1}{2\pi R_iC_o} \qquad \text{(X)}$$

It will be appreciated that Equation X shows that the resonant frequency is established entirely by the product of passive elements, namely resistance and capacitance, and is independant of tube gain or characteristics, a highly desirable result assuring frequency stability.

Figure 4:
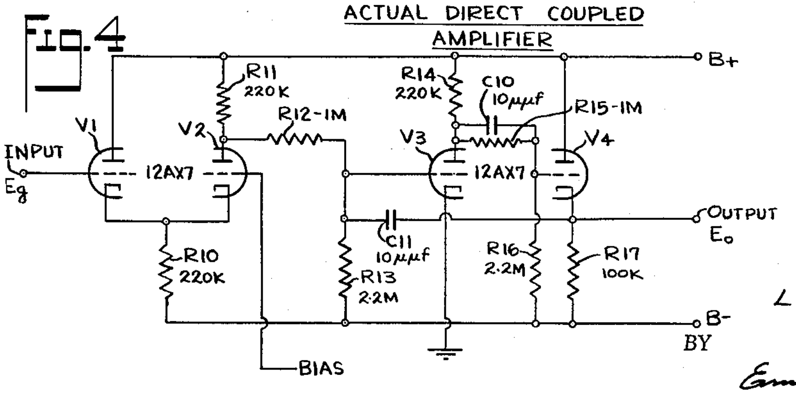
FIG. 4 is a schematic diagram of a direct coupled amplifier suitable for use as an operational amplifier for the purposes of the invention.

The actual construction or internal wiring of one of the operational amplifiers considered under the generic designation —A is shown in FIG. 4. It is a direct coupled amplifier utilizing four stages, each stage being one half of a twin triode tube such as type 12AX7. Typical values of circuit elements suitable for the functions intended are indicated in the drawing. The grid signal indicated earlier as $E_g$ is supplied to the grid or control electrode of triode V1 which is connected as a cathode follower in order to provide a high input impedance. The output signal from V1 is developed across cathode load resistor R10 which is also common to V2. The second stage V2 operates as a grounded grid amplifier and its output is developed across anode load resistor R11 and direct coupled from the junction of resistors R12 and R13 to the grid of V3. The third stage V3 operates as an anode coupled amplifier and its output is developed across anode load resistor R14 and direct coupled from the junction of resistors R15 and R16 to the grid of V4. The last stage V4 operates as a cathode follower and the output signal is developed across cathode load resistor R17 to provide a low impedance output.

It will be observed that the input signal is translated through V1 and V2 without change in phase, is reversed in phase at the anode of V3, and is translated through V4 without further change in phase. Thus the output signal $E_o$ at the cathode of V4 is reversed in phase from the input signal $E_i$ at the grid of V1. Since the amplifier is direct coupled throughout by resistors, there is no lower limit to the frequency response. The small capacitor C10 shunting coupling resistor R15 increases the gain slightly at the higher frequencies, and together with small capacitor C11 providing negative feedback of the higher frequencies from the cathode of V4 to the grid of V3, assures linearity of response up into the high frequencies. The amplifier is energized from B+ and B— as shown, and the bias adjustment to the grid of V2 is used to adjust the D.C. level at the output terminal to zero in the absence of any input signal. The gain of the amplifier from grid input to V1 to cathode output at V4 may be approximately 1000.

Although the synthesized resonant circuit shown in FIG. 3 has a natural resonant frequency which is determined by the constants of its passive networks as previously discussed, it will not go into sustained oscillations unless a positive or regenerative feedback signal is supplied. More importantly, in order to have a useful signal generator, some means must be provided to control and regulate the amplitude of the oscillations. A preferred circuit embodying the invention and accomplishing these functions is illustrated in FIG. 5.

Figures 5, 6:
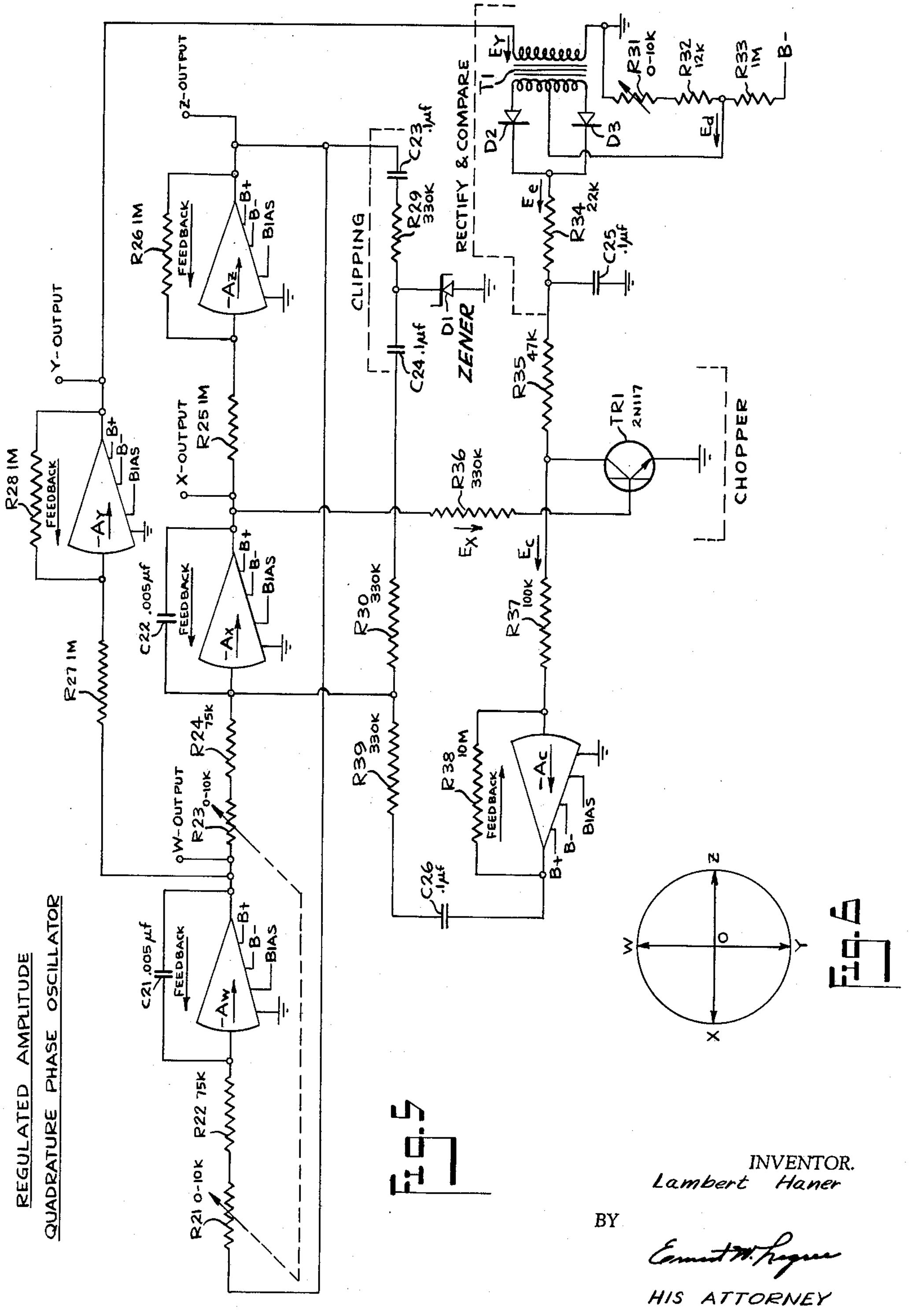
FIG. 5 is a combined block and circuit diagram of a multi-phase variable frequency regulated amplitude oscillator embodying the invention and providing quadrature phase signals.
FIG. 6 illustrates the angular relationship of the quadrature outputs of the oscillator of FIG. 4.

Referring to FIG. 5, the three operational amplifiers indicated generally by $-A_W$, $-A_X$, and $-A_Z$ are connected in a closed loop or ring configuration to form a synthetic resonant circuit. For amplifier $-A_W$, variable resistance R21 and resistor R22 in series form the input impedance, and capacitor C21 forms the feedback impedance; it operates as a 90° phase advancer and thus provides the W phase output from the Z phase supplied to it as its input signal. For amplifier $-A_X$, variable resistor R23 and resistor R24 in series, and capacitor C22 form respectively the input and feedback impedances; it likewise operates as a 90° phase advancer and provides the X phase output from the W phase supplied to it. For amplifier $-A_Z$, resistor R25 forms the input impedance, and resistor R26 forms the feedback impedance; it operates as a phase inverter, or in other words it advances the phase 180° and provides the Z phase output from the X phase supplied to it. To form the fourth quadrature phase output, amplifier $-A_Y$ inverts the phase of the W signal supplied to it from the output of the $-A_W$ amplifier to provide the Y phase output. For amplifier $-A_Y$, resistor R27 forms the input impedance and resistor R28 forms the feedback impedance. The angular relationship of the four quadrature outputs, namely the W, X, Y and Z phase signals are shown in FIG. 6. The resonant frequency of the synthesized circuit is controlled by variable resistors R21 and R23 which are ganged together as indicated, and equal in value. The fixed resistors R22 and R24 are likewise equal in value, so that either $R21+R22$, or $R23+R24$ gives the term $R_i$ in Equation X which determines the resonant frequency $f_r$. In other words, the resonant frequency varies inversely as the sum of variable resistor R21 and fixed resistor R22, under the conditions stated for the circuit.

In order to have sustained oscillations, a regenerative or positive feedback signal is supplied by feeding the Z phase output of the $-A_Z$ amplifier through a clipping network to the input of the $-A_X$ amplifier. The clipping network comprises D.C. blocking capacitor C23, limiting resistor R29, and zener diode D1 connected to provide a by-pass to ground. The zener diode short-circuits the negative half cycles to ground, and further provides a fixed clipping level which clips the peaks of the positive half cycles when the amplitude of the sine wave input rises beyond a predetermined level. At the zener diode, the output signal is nearly a square wave consisting of clipped positive half cycles. The A.C. component of this square wave is transmitted through D.C. blocking capacitor C24 and through input resistor R30 to the $-A_X$ amplifier. Since the clipping level is fixed, the gain through the clipping circuit diminishes as the oscillator signal level increases. Thus the oscillator signal amplitude will build up until the gain through the positive feedback path of the clipping circuit is just sufficient to maintain the oscillations at the corresponding level. Under this particular condition, the overall equivalent Q of the circuit is in fact infinite and oscillations at the given level will continue indefinitely. Although the output of the clipping circuit is nearly a square wave, because the synthesized resonant circuit possesses a high equivalent Q, the harmonic content of the square wave is rejected and the output waveform of the oscillator remains a sine wave with negligible distortion. In the circuit illustrated using the typical values of components given in the drawings and B+ and B— supplies of +300 and −300 volts respectively, when the regenerative feedback signal provided by the clipping circuit is coupled to the synthesized resonant circuit, the amplitude of oscillations will rise to approximately 30 volts R.M.S.

As the frequency of the oscillator is varied, the Q of the synthesized resonant circuit may vary and this would cause the amplitude of oscillations likewise to vary. Therefore to have fine control and regulation of the amplitude of oscillations, a regulator circuit is incorporated into the quadrature phase oscillator. In the illustrated circuit with the values of circuit elements given by way of example, it allows the amplitude of oscillations to be set anywhere in the range of 9 to 14 volts by means of a manual adjustment of variable resistor or potentiometer R31, and to be maintained at the preset value within an accuracy better than ¼%. The regulator circuit operates by rectifying the Y phase output from amplifier $-A_Y$ and comparing it to preset D.C. level to provide a D.C. error signal. The error signal $E_e$ is equal to the difference between the rectified Y phase signal and the D.C. reference voltage $E_d$. A transistor chopper circuit then converts the D.C. error signal $E_e$ into a square wave voltage $E_C$ at the oscillator frequency, the chopping signal being the X phase output from the $-A_X$ amplifier. The square wave voltage $E_C$ is then amplified by amplifier. $-A_C$ and fed into the grid input of the $-A_X$ amplifier as a negative or degenerative feedback signal. The voltage $E_C$ from amplifier $-A_C$ modifies the effect of the signal from the clipping circuit in such manner as to either increase or decrease the amount of regeneration that is applied. Thus a well regulated amplitude of oscillation is achieved without causing any change in the frequency of oscillation.

The D.C. error signal is obtained by feeding the Y phase output from the $-A_Y$ amplifier to the primary of transformer T1 whose secondary is connected through diodes D2 and D3 in a full wave rectifying circuit. The preset D.C. level is applied to the center tap of the secondary and is obtained from the B— supply at the junction of resistors R32 and R33, with variable resistor R31 allowing adjustment. The D.C. error signal $E_e$ is obtained at the junction of the diodes and it is filtered and smoothed by resistor R34 and filter capacitor C25. The D.C. error signal $E_e$ is applied, in series with load resistor R35, across the collector-emitter path of transistor TR1. At the same time, the X phase signal from amplifier $-A_X$ is applied through resistor R36 across the base-emitter path of the transistor. This results in a square wave output signal $E_C$ at the collector whose amplitude is proportional to the D.C. error signal $E_e$ and which is chopped in accordance with the frequency and phase of the X phase signal. The square wave control signal $E_C$ is then supplied through input resistor R37 to amplifier $-A_C$ which is a direct coupled amplifier identical to the others and illustrated in FIG. 4. Amplifier $-A_C$ is provided with negative feedback by means of feedback resistor R38, and its output is supplied through D.C. blocking capacitor C26 and input resistor R39 to the grid input of the $-A_X$ amplifier. The square wave control signal $E_C$ is of such phase as to modify the effect of the regenerative signal from the clipping circuit in a direction to maintain the amplitude of oscillations constant according to the level established by the setting of variable resistor R31.

As previously stated, the frequency of oscillation is varied by changing the setting of variable resistors R21 and R23 by identical amounts, these resistors being in the form of potentiometers ganged to a common shaft for this purpose. The W, X, Y, and Z quadrature phase outputs of the oscillator may be expressed mathematically as follows, as indicated in FIG. 6:

$$E_W = E.\sin wt$$
$$E_X = E.\sin(wt + \pi/2)$$
$$E_Y = E.\sin(wt + \pi)$$
$$E_Z = E.\sin(wt + 3\pi/2)$$

Figures 7, 8, 9:
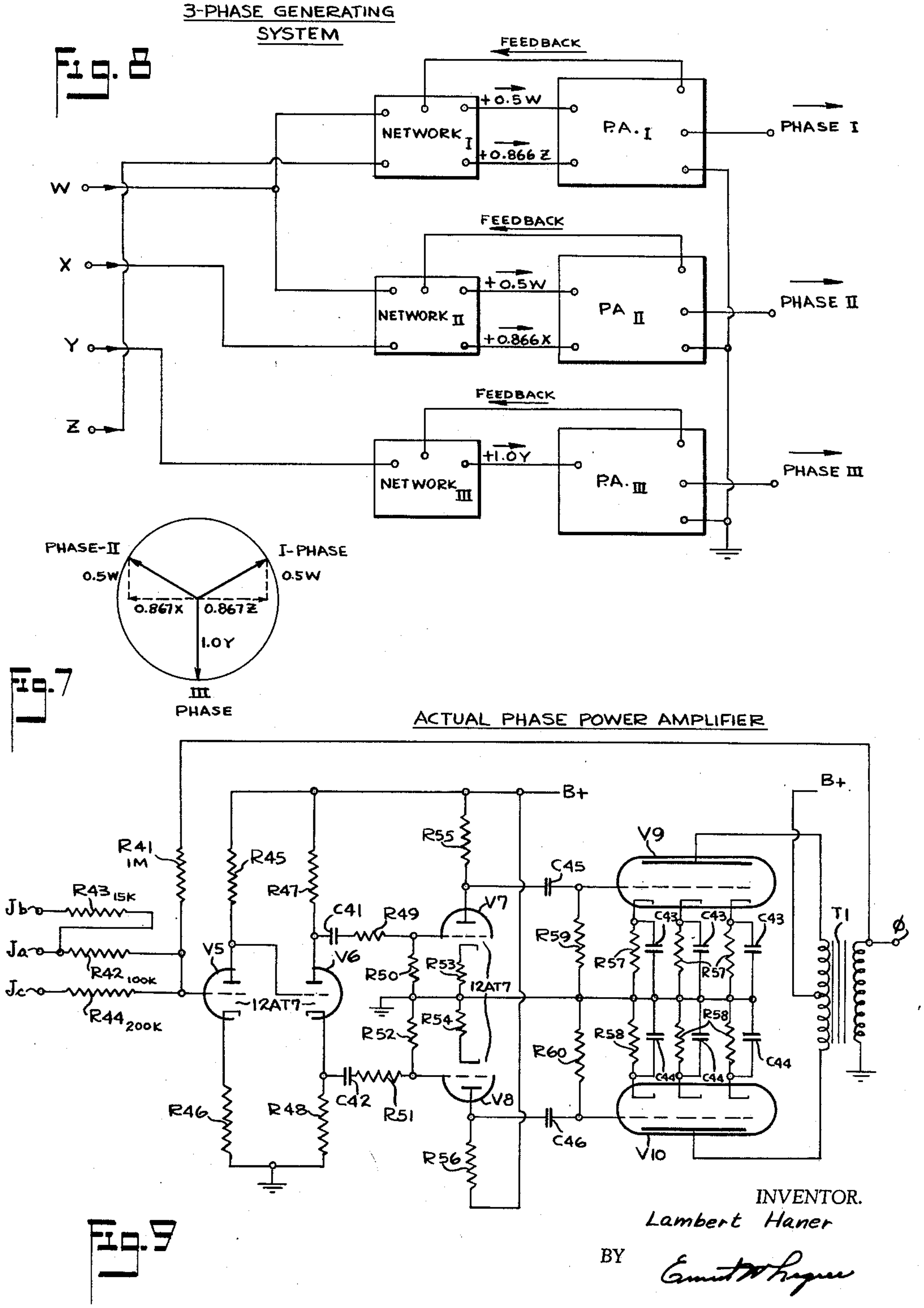
FIG. 7 illustrates the trigonometric addition of quadrature phase components to produce three phase resultants.
FIG. 8 is a block diagram of the power amplifiers connected to produce a three phase output from the quadrature phase components.
FIG. 9 is a schematic diagram of one of the power amplifiers.

In accordance with the invention, multiphase outputs are obtained by the trigonometric or vector addition of predetermined fractions of the W, X, Y, and Z quadrature phase outputs of the regulated oscillator, followed by voltage or power amplification as required. Since the quadrature components span a full 360°, any desired phase output may be obtained. The selection of component fractions for producing a three phase output according to a preferred embodiment of the invention is illustrated in FIG. 7. The three phase voltages $E_I$, $E_{II}$, and $E_{III}$ are obtained by the following combinations:

$$E_I = 0.5E_W + 0.87E_Z$$
$$E_{II} = 0.5E_W + 0.87E_X$$
$$E_{III} = 1.0E_Y$$

It will be observed that the component fractions of the quadrature phase components consist of the sine or cosine of 30° where two components are combined in the cases of phases I and II, and unity in the case of phase III where a single component is used.

FIG. 8 illustrates in block form a three-phase generating system comprising three power amplifiers $P.A._I$, $P.A._{II}$, and $P.A._{III}$, each with its input network to achieve the desired vector addition of quadrature phase components. $P.A._I$ is supplied with the W and Z phase signals according to the above given relationship; $P.A._{II}$, with the W and X phase signals; and $P.A._{III}$, with the Y phase signal. The three phase outputs, one from each power amplifier, consist of three voltages equal in magnitude with 120° phase intervals.

The actual construction and wiring of a power amplifier suitable for use in the three-phase generating system of FIG. 8 is shown in FIG. 9. Typical values of some circuit elements are indicated in the drawing; others are conventional. The amplifier has high gain and utilizes negative feedback to stabilize the gain and reduce the output impedance. The resistance network that provides for negative feedback and determines the overall closed loop gain comprises feedback resistor R41 and input resistors R42, R43, and R44. The feedback resistor is connected between phase output terminal $\phi$ of the secondary of output transformer T1, and the grid input to first stage triode V5. The input resistors are connected between input terminals J*a*, J*b*, and J*c* and the grid input to V5. Through the application of Formula IV for the closed loop gain, namely $E_o/E_i = Z_o/Z_i$, using the values of resistors indicated in the drawing, it is seen that the following gains are obtained in respect of signals applied to the input terminals:

Terminal J*a*: a gain of 10
Terminal J*b*: a gain of 8.7
Terminal J*c*: a gain of 5

Therefore by applying to terminals J*a*, J*b*, and J*c* the quadrature phase signals $E_W$, $E_X$, $E_Y$, and $E_Z$ in accordance with the selection scheme indicated in FIG. 8 and at an amplitude of 11.5 volts, the desired three phase output $E_I$, $E_{II}$, or $E_{III}$ will be obtained at output terminal $\phi$ at an amplitude of 115 volts, measured phase to neutral.

The circuitry of the power amplifier comprises a voltage amplifier section consisting of triode tube sections V5, V6, V7 and V8, and a power amplifying section consisting of triode tubes V9 and V10, each section having its own B+ supply. The input signal subject to feedback is amplified by stage V5 having anode load resistor R45 and cathode load resistor R46, and is direct coupled to the grid of stage V6. Stage V6 operates as a paraphase amplifier, signals identical in amplitude but 180° out of phase being developed at the anode and cathode across load resistors R47 and R48 respectively. These signals are coupled to the grids of tubes V7 and V8 by the networks C41, R49, R50, and C42, R51, R52. Triode tubes V7 and V8 together operate as a push-pull driver stage; cathode resistors R53 and R54 provide grid bias and the output signals are developed across anode load resistors R55 and R56.

The power amplifying section is a push-pull configuration utilizing a pair of triode tubes V9, V10 (type 7241). Each tube comprises three separate cathodes, a common grid or control electrode, and a common anode. The tubes are operated with self-bias which is generated by the voltage drop across the three cathode resistors, R57 for V9 and R58 for V10. Electrolytic bypass capacitors C43 and C44 are used in shunt with each cathode resistor to reduce A.C. attenuation. The signals are coupled from the anodes of V7 and V8 to the grids of V9 and V10 by capacitors C45 and C46 respectively, resistors R59 and R60 serving for grid leakage. The anodes of V9 and V10 are connected to opposite ends of the primary of transformer T1 whose center tap is energized with the B+ supply, and the selected phase output is taken at terminal $\phi$ of the secondary. Preferably the bias for tubes V9, V10 is adjusted so that the tubes operate class A for low output power demand, for instance less than 60 watts where the tubes have a plate power dissipation rating of 100 watts. At output power demands above 60 watts, the operating point moves up into class AB.

The three phase signal generator which has been described herein by way of example will operate from the usual 105–125 volt, 60 c.p.s. single phase supply and provide a three phase, 115 volt, 300 volt-ampere output with the frequency continuously adjustable within predetermined ranges centering about 400 c.p.s., for instance from 375 to 423 c.p.s., or from 300 to 530 c.p.s. Since both the frequency and the vector addition of components to produce three phase resultants are determined entirely by passive networks consisting of resistance and capacitance or resistance alone and independently of the characteristics of active elements such as tube gain, a very high order of frequency stability, phase balance, and amplitude balance are obtained. Frequency and amplitude of output are easily adjusted and controlled, and these results are achieved using interchangeable modular active components consisting of the direct coupled amplifiers and the power amplifiers which have been described, thereby making for economy of manufacture and ease of servicing.

The preferred embodiment of the invention which has been illustrated and described is intended of course as illustrative of the invention and not by way of limitation. Various modifications will readily occur to those skilled in the art, and in particular, the construction of the active components may be changed to use different configurations or to use transistors instead of electron tubes while still following the principles of the invention. The appended claims are therefore intended to cover any such modifications as come within the true spirit and scope of the invention.

What I claim as new and desire to secure by Letters Patent of the United States is:

1. A variable frequency multi-phase signal generator comprising an oscillator including three operational amplifiers connected in a ring configuration wherein two of said amplifiers have substantially unity gain and 90° phase shift at an adjustable frequency and one of said amplifiers has substantially unity gain and 180° phase shift, said ring configuration thereby forming a synthesized resonant circuit providing quadrature signals at the outputs of said amplifiers, means for introducing a regenerative signal into one of said amplifiers in order to maintain oscillations in said synthesized resonant circuit, and a plurality of phase amplifiers having resistance input networks and gain stabilized by resistance feedback, said phase amplifiers transmitting predetermined fractions of said quadrature signals selected to combine vectorally to produce the desired multiphase signals.

2. A variable frequency multi-phase signal generator comprising an oscillator including three operational amplifiers having high internal gain, said amplifiers being connected in a ring configuration, two of said amplifiers being provided with input resistance and feedback capacitance proportioned for unity gain and 90° phase shift at an adjustable frequency and one of said amplifiers being provided with input and feedback resistances proportioned for unity gain and 180° phase shift, said ring configuration thereby forming a high Q synthesized resonant circuit at said selected frequency and providing sinusoidal signals at the outputs of said amplifiers, means for introducing a regenerative signal of regulated amplitude into one of said amplifiers in order to maintain oscillations at said selected frequency, and a plurality of phase amplifiers having resistance input networks and gain stabilized by resistance feedback, said input networks being connected to the outputs of said operational amplifiers and transmitting predetermined fractions of said quadrature signals, said fractions being selected to combine vectorally and, by linear amplification in said phase amplifiers, to produce the desired multi-phase signals.

3. A variable frequency three phase signal generator comprising an oscillator including four operational amplifiers having high internal gain and 180° internal phase reversal between input and output, three of said amplifiers being connected in a ring configuration wherein first and second amplifiers are provided with input resistance and feedback capacitance proportioned for unity gain and 90° phase shift in said two amplifiers at a selected frequency of operation and a third amplifier is provided with input resistance and feedback resistance proportioned for unity gain and 180° phase shift, said ring configuration thereby forming a high Q synthesized resonant circuit at said selected frequency, the fourth amplifier being provided with input and feedback resistances proportioned for unity gain and 180° phase shift and receiving its input from the output of said first amplifier, said oscillator thereby providing quadrature sinusoidal signals at 90° phase intervals at the outputs of said four amplifiers, means for introducing a regenerative signal of regulated amplitude into one of said amplifiers in order to maintain oscillations at said selected frequency, and three phase amplifiers having resistance input networks and gain stabilized by resistance feedback, said input networks being connected to selected ones of said operational amplifiers and transmitting predetermined fractions of said quadrature signals, said fractions being selected to combine vectorally and, by linear amplification in said phase amplifiers, to produce three phase signals at 120° intervals.

4. A variable frequency three phase signal generator comprising an oscillator including three operational amplifiers connected in a ring configuration wherein the first and second of said amplifiers have substantially unity gain and 90° phase shift at an adjustable frequency and the third of said amplifiers has substantially unity gain and 180° phase shift, said ring configuration thereby forming a synthesized resonant circuit providing quadrature W, X and Z signals at the outputs of said amplifiers, means for introducing a regenerative signal into one of said amplifiers in order to maintain oscillations in said synthesized resonant circuit, a fourth operational amplifier having substantially unity gain and 180° phase shift and receiving its input from the output of said first amplifier to provide a quadrature Y signal, and three phase amplifiers having resistance input networks and gain stabilized by resistance feedback, the first of said amplifiers vectorally adding 0.5–W and 0.867–Z signals to provide phase I output, the second of said amplifiers vectorally adding 0.5–W and 0.867–X signals to provide phase II output, and the third of said amplifiers using 1.0–Y signal to provide phase III output.

5. A regulated amplitude variable frequency oscillator comprising three operational amplifiers having high internal gain connected in a ring configuration wherein two of said amplifiers have substantially unity gain and 90° phase shift and one of said amplifiers has substantially unity gain and 180° phase shift, said ring configuration forming a synthesized resonant circuit at a frequency determined by said two amplifiers, a clipping circuit operating at a constant clipping level on the sinusoidal output signal of one of said amplifiers and providing a generally square wave regenerative signal of constant amplitude to the input of another of said amplifiers, and an amplitude regulating circuit comprising a rectifying and comparing circuit providing a D.C. error signal proportional to the departure of the amplitude of oscillations from a preset level, and means including a chopper circuit translating said D.C. error signal into a corresponding A.C. signal at said determined frequency and feeding it into one of said amplifiers in said ring to regulate the amplitude of oscillations therein.

6. A regulated amplitude variable frequency oscillator comprising three operational amplifiers having high internal gain connected in a ring configuration wherein the first and second of said amplifiers have substantially unity gain and 90° phase shift at an adjustable frequency and the third of said amplifiers has substantially unity gain and 180° phase shift, said ring configuration forming a synthesized resonant circuit at a frequency determined by said first and second amplifiers and providing quadrature sinusoidal signals at the outputs of said amplifiers, a clipping circuit operating at a constant clipping level on the quadrature output signal of one of said amplifiers and providing a generally square wave regenerative signal of constant amplitude to the input of another of said amplifiers, and an amplitude regulating circuit comprising a rectifying and comparing circuit providing a D.C. error signal proportional to the departure of the amplitude of oscillations from a preset level, a chopper circuit receiving a quadrature input signal from the output of one of said amplifiers and translating said D.C. error signal into an A.C. control signal at a frequency and phase corresponding to said quadrature input signal, and an amplifier feeding said A.C. control signal to the input of said one amplifier to regulate the amplitude of oscillations in said ring.

7. A regulated amplitude variable frequency oscillator comprising three operational amplifiers having high internal gain connected in a ring configuration wherein the first and second of said amplifiers have substantially unity gain and 90° phase shift at an adjustable frequency and the third of said amplifiers has substantially unity gain and 180° phase shift, said ring configuration forming a synthesized resonant circuit at a frequency determined by said first and second amplifiers and providing quadrature sinusoidal signals at the outputs of said amplifiers, a clipping circuit operating at a constant clipping level on the quadrature output signal of one of said amplifiers and providing a generally square wave regenerative signal of constant amplitude to the input of another of said amplifiers, and an amplitude regulating circuit comprising a full wave rectifying circuit providing a D.C. signal proportional to the amplitude of one of said quadrature signals and a difference circuit comparing said D.C. signal to a preset D.C. voltage to provide a D.C. error signal proportional to the departure of the amplitude of oscillations from a preset level, a chopper circuit receiving a quadrature input signal from the output of one of said amplifiers and translating said D.C. error signal into an A.C. control signal at a frequency and phase corresponding to said quadrature input signal, and an amplifier feeding said A.C. control signal to the input of said one amplifier to regulate the amplitude of oscillations in said ring.

8. A regulated amplitude variable frequency oscillator comprising W, X and Z operational amplifiers having high internal gain connected in a ring configuration wherein the first and second of said amplifiers have substantially unity gain and 90° phase shift at an adjustable frequency and the third of said amplifiers has substantially unity gain and 180° phase shift, said ring configuration forming a synthesized resonant circuit at a frequency determined by said first and second amplifiers and providing quadrature W, X and Z sinusoidal signals at the outputs of said amplifiers, a fourth Y operational amplifier having substantially unity gain and 180° phase shift and receiving a W input signal from said first amplifier and providing a Y quadrature output signal, a clipping circuit operating at a constant clipping level on the Z quadrature output signal of said third amplifier and providing a generally square wave regenerative signal of constant amplitude to the input of said second amplifier, and an amplitude regulating system comprising a full wave rectifying circuit providing a D.C. signal proportional to the amplitude of said Y signal and a difference circuit comparing said D.C. signal to a preset D.C. voltage to provide a D.C. error signal proportional to the departure of the amplitude of oscillations from a preset level, a chopper circuit receiving said X quadrature signal from said second amplifier and translating said D.C. error signal into an A.C. control signal at a frequency and phase corresponding to said X quadrature signal, and an amplifier feeding said A.C. control signal to the input of said second amplifier to regulate the amplitude of oscillations in said ring.

9. A variable frequency three phase signal generator comprising a regulated amplitude variable frequency oscillator as defined in claim 8, and three phase amplifiers having resistance input networks and gain stabilized by resistance feedback, the first of said phase amplifiers vectorally adding 0.5–W and 0.867–Z signals to provide phase I output, the second of said phase amplifiers vectorally adding 0.5–W and 0.867–X signals to provide phase II output, and the third of said phase amplifiers using 1.0–Y signal to provide phase III output.

References Cited in the file of this patent

UNITED STATES PATENTS

| | | |
|---|---|---|
| 2,633,534 | Anderson | Mar. 31, 1953 |
| 2,819,442 | Goodrich | Jan. 7, 1958 |

OTHER REFERENCES

Dawes: A Course in Electrical Engineering, 1934, pp. 272–274, McGraw-Hill Co. Publisher.

Good: Electronic Engineering, May 1957, pp. 210–213.